Feb. 1, 1949.  J. E. NOGLE  2,460,466
TRAILER DOLLY
Filed Feb. 4, 1946
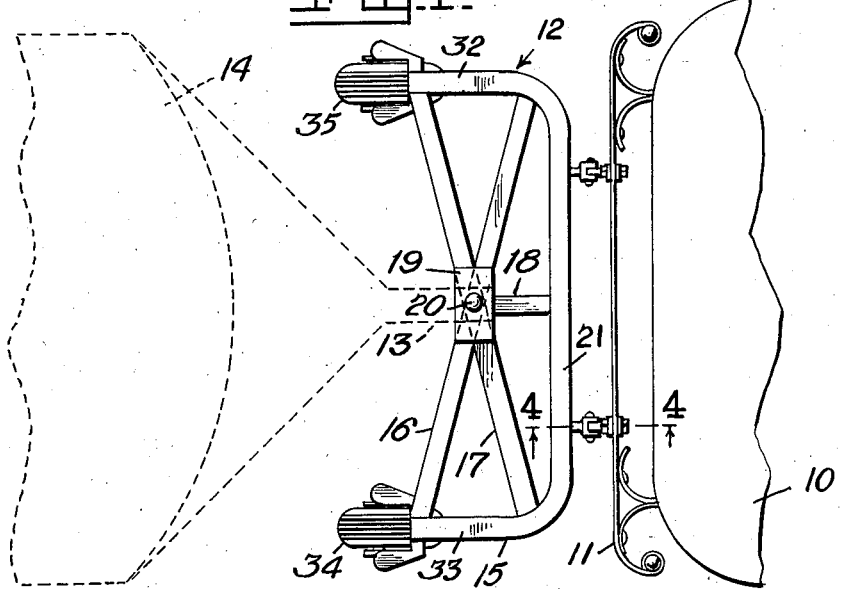
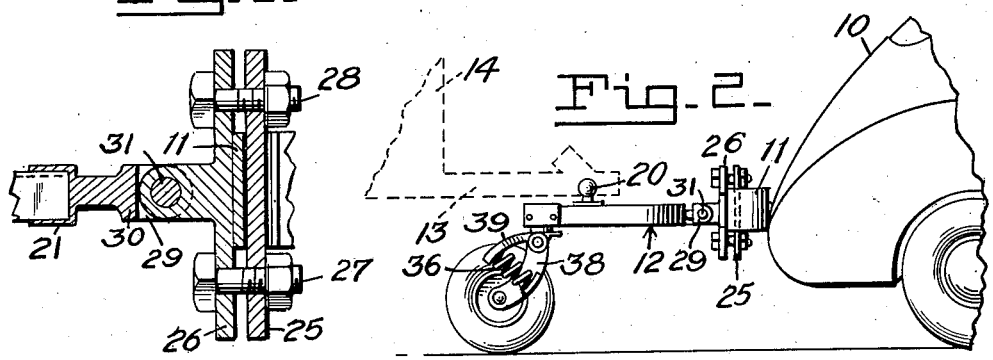
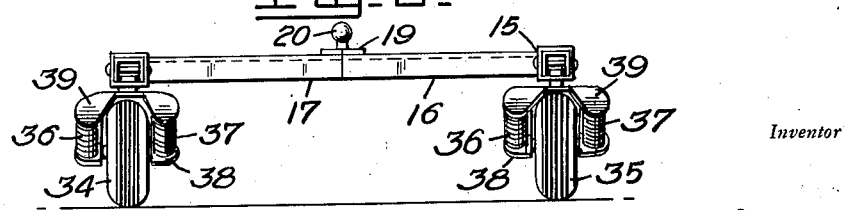
Inventor
James Elliott Nogle
By Randolph & Beavers
Attorneys Patented Feb. 1, 1949

2,460,466

UNITED STATES PATENT OFFICE 2,460,466

TRAILER DOLLY

James Elliott Nogle, Jacksonville Beach, Fla.

Application February 4, 1946, Serial No. 645,274

1 Claim. (Cl. 280—33.4)

This invention relates to dollies that are used in connection with automobile trailers.

The primary objective of the invention is to provide an improvement in dollies that carry practically all of the weight of the front end of the trailer.

Another object is the provision of an automobile dolly that is attached to the rear bumper of the tow car and that requires no expensive or complicated parts for the attaching means.

And another object is to provide a dolly of extreme simplicity and one that may be economically manufactured.

The manner in which the above and other objects are effectuated will be readily apparent from a reading of the specification taken in connection with the accompanying drawing, in which:

Figure 1 is a top plan view of the dolly in its operative position;

Figure 2 is a side elevation;

Figure 3 is a front elevation of the dolly removed from the tow car, and

Figure 4 is an enlarged detail view of the connecting means taken on line 4—4 of Figure 1.

Similar numerals refer to similar parts throughout the several views.

In the drawing the numeral 10 refers to a tow car which has any conventional type of rear bumper 11 thereon. To the bumper is attached a dolly 12 which is arranged to receive a draw-bar 13 of a trailer 14.

The dolly frame is preferably made of channel iron and consists of a U-shaped member 15 which has attached thereto the diagonal cross supports 16 and 17, the supports forming an X and being reinforced against lateral tension by the bar 18.

Where the members 16 and 17 cross, there is provided a reinforcing plate 19 which also acts as a support and attaching means for the ball 20. The elements 19 and 20 may be made integral or separate.

To the transverse portion 21 of the dolly is attached the means by which the dolly is connected to the bumper 11 and while, in the drawing, only two of such means are illustrated, it should be understood that any number may be employed. This attaching means is very simple of design and application and consists of a removable plate 25, which is clamped over the bumper 11 to the plate 26, by means of the bolts 27 and 28.

On the plate 26 is a forked standard 29 which holds a member 30 by means of the bolt 31. The joint thus formed will permit up and down motion between the dolly and the tow car and as the forward end of draw-bar 13 fits over the ball 20 the turning angle of the tow car will be followed by the trailer.

At the ends of the arms 32 and 33 are located swivel wheels 34 and 35 which afford the means by which the front end of the trailer is supported. The swiveling action of the wheels will permit them to easily follow the direction of the tow car.

In order to compensate for roughness in the roadway I provide springs 36 and 37 on each of the wheels 34 and 35. The springs are positioned between a movable arm 38 and a stationary arm 39. The vertical action of the front of the trailer is thereby minimized and cushioned.

While I have illustrated and described the preferred form of the invention, it should be understood that various changes may be made within the scope of the appended claim.

What I claim is:

In combination with a trailer vehicle and a draft vehicle, a dolly for connecting the trailer and draft vehicles and for supporting the forward end of the former, said dolly including a substantially U-shaped, rearwardly opening frame, wheels supporting the dolly and swivelly connected to the rearwardly extending ends of the frame, the intermediate portion of the frame being disposed transversely thereof and being provided with forwardly projecting bracket arms, clamps detachably connected to the rear bumper of the draft vehicle and each having a rearwardly projecting bracket arm pivotally connected to one of said forwardly projecting bracket arms, crossed braces connecting the rearwardly extending ends of the frame, a brace connecting the intermediate frame portion to the crossed portions of the cross braces, and a reinforcing plate secured to said crossed portions of the first mentioned braces and having an upstanding coupling element for engagement with the trailer vehicle.

JAMES ELLIOTT NOGLE.

REFERENCES CITED

The following references are of record in the file of this patent:

UNITED STATES PATENTS

| Number | Name | Date |
|---|---|---|
| 2,139,970 | Moore | Dec. 13, 1938 |
| 2,325,822 | Whitmer | Aug. 3, 1943 |
| 2,379,170 | McDaniel | June 26, 1945 |
| 2,381,190 | Tiner et al. | Aug. 7, 1945 |